United States Patent [19]

Hayakawa et al.

[11] Patent Number: 4,870,443

[45] Date of Patent: Sep. 26, 1989

[54] PHOTOMETRIC DEVICE

[75] Inventors: Shingo Hayakawa; Shuichi Kiyohara, both of Kanagawa, Japan

[73] Assignee: Canon Kabushiki Kaisha, Tokyo, Japan

[21] Appl. No.: 134,814

[22] Filed: Dec. 18, 1987

[30] Foreign Application Priority Data

Dec. 29, 1986 [JP] Japan .................................. 61-310162

[51] Int. Cl.$^4$ ............................ G03B 7/08; G01J 1/42
[52] U.S. Cl. ....................................... 354/432; 356/222
[58] Field of Search ............... 354/429, 430, 431, 432, 354/433, 434; 356/222; 250/214 P, 214 C

[56] References Cited

U.S. PATENT DOCUMENTS 3,717,077 2/1973 Harvey ................................. 354/432
4,364,650 12/1982 Terashita et al. .................... 354/432
4,589,756 5/1986 Saegusa ............................... 354/432

Primary Examiner—W. B. Perkey
Attorney, Agent, or Firm—Fitzpatrick, Cella, Harper & Scinto

[57] ABSTRACT

A photometric device of the kind obtaining information on the luminance of each of photometric areas defined by dividing a photographing field at least into a middle area and a peripheral area and computing a photometric value on the basis of luminance information obtained from the middle and peripheral areas includes: detecting means for detecting whether the luminance information obtained from the peripheral area exceeds a given upper limit luminance level; and correcting means which is arranged to substitute a specific luminance information value for the luminance information obtained from the peripheral area when the latter is detected by the detecting means to be exceeding the upper limit luminance level.

2 Claims, 9 Drawing Sheets

FIG.7(h)   FIG.7(a)   FIG.7(b)
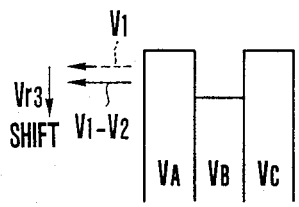
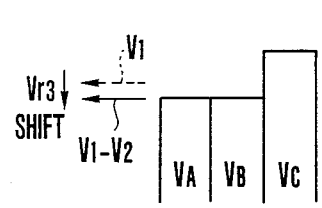
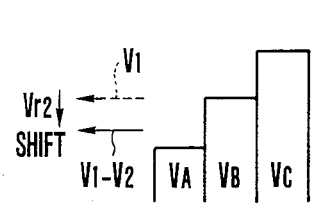
FIG.7(g)   FIG.7(i)   FIG.7(c)
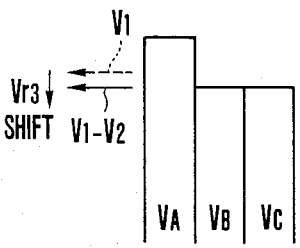
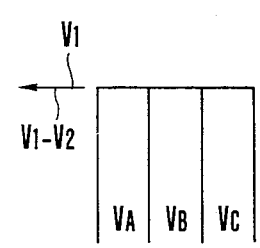
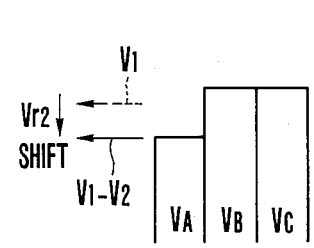
FIG.7(f)   FIG.7(e)   FIG.7(d)
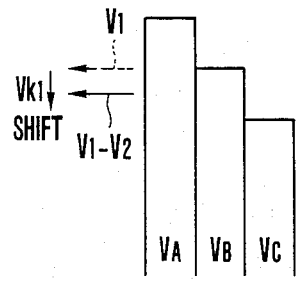
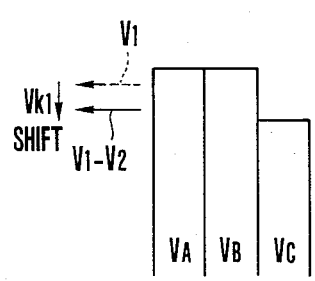
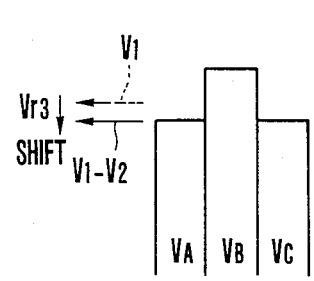

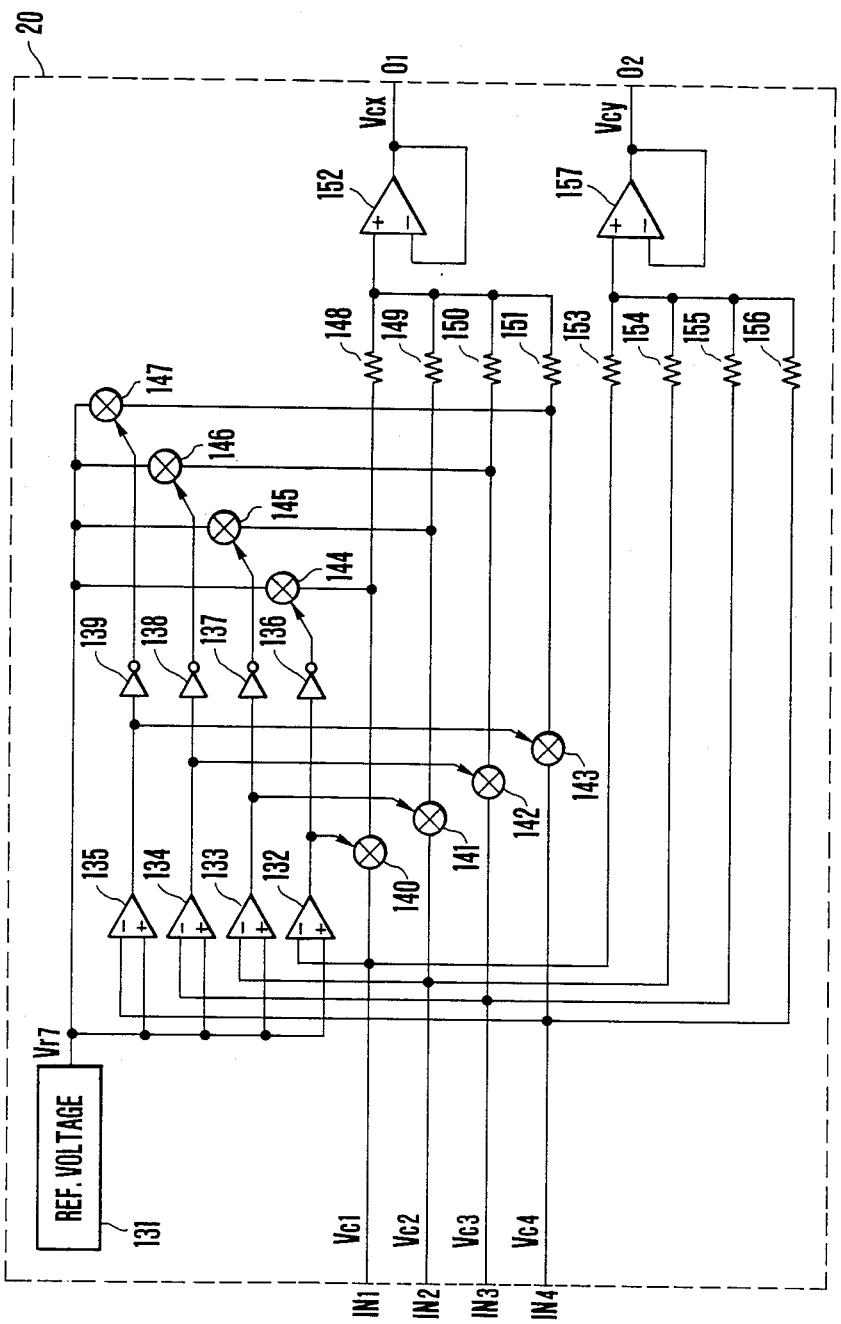
F I G. 10

PHOTOMETRIC DEVICE

BACKGROUND OF THE INVENTION

1. Field of the Invention

This invention relates to a photometric device for obtaining a photometric value by dividing a photographing field into a plurality of photometric areas and by computing in varied manners information on measured luminance of each of the areas.

2. Description of the Related Art

There have been proposed various photometric devices of the kind arranged to divide a photographing field into a plurality of areas, to obtain a plurality of measured light values by measuring the light of each of the areas and to give a suitable exposure to a photo taking image plane on the basis of the measured values. For example, Japanese Utility Model Publication No. SHO 51-9271 has disclosed a photometric device which obtains an apposite photometric value by using an arithmetical mean of the maximum and minimum values of the photo-electic outputs of a plurality of photo-electric elements. This photometric device, however, has presented a problem that an under- or over-exposure results from such a photographing object that has an unusually bright or dark background. Further, U.S. Pat. No. 4,476,383 discloses a photometric device which is arranged such that, in case where, some of the outputs of a plurality of photo-electric elements comes to exceed a given threshold value for a number of times exceeding a given number of times, a computing operation is performed by replacing the exceeding portion of the outputs with a predetermined value. This device is, however, arranged to give a predetermined exposure even in cases where it is inadequate, because any object luminance level that exceeds a given luminance value is undeterminable. For example, in photographing a white object under a clear sky, the exposure becomes either an over-exposure or an under-exposure according to the intensity of light on the object. It is another problem with this device that, since accurate luminance difference information is not obtainable at a luminance level around the given threshold value, it is impossible to determine an exposure by judging the lightness or luminance distribution of the photographing field. U.S. Pat. No. 4,561,753 also has made a disclosure on a concept similar to that of the above cited U.S. Pat. No. 4,476,383.

Further, although it cannot be regarded, in the strict sense, as the prior art relative to this invention, the present inventor has previously invented photometric devices of the kind arranged to divide a photographing field into a plurality of photometric areas to measure the light of each of these areas and to obtain a photometric value by computing information on a plurality of luminance values obtained from these areas. These devices are disclosed respectively in U.S. Pat. application Ser. Nos. 894,613 filed Aug. 8, 1986, 009,995 filed Feb. 2, 1987, and 043,935 filed Apr. 29, 1987.

SUMMARY OF THE INVENTION

This invention is directed to the solution of the above stated problems of the prior art. Therefore, it is an object of the invention to provide a photometric device which is capable of obtaining a photometric value apposite to a main object to be photographed even in the event of a high degree of luminance in the peripheral part of a photographing field on the assumption that the main object is located in the middle part of the photographing field.

The above and other objects and features of this invention will become apparent from the following detailed description of embodiments thereof taken in connection with the accompanying drawings.

BRIEF DESCRIPTION OF THE DRAWINGS

FIGS. 7(a) to 7(i), 8(a), 8(b) and 9(a) to 9(i) are illustrations relative to computing formulas to be used in obtaining photometric values under varied luminance conditions of the photographing field.

FIG. 10 is a circuit diagram showing another example of arrangement of the peripheral luminance computing circuit shown in FIG. 3.

DETAILED DESCRIPTION OF THE PREFERRED EMBODIMENTS

Figure 1:
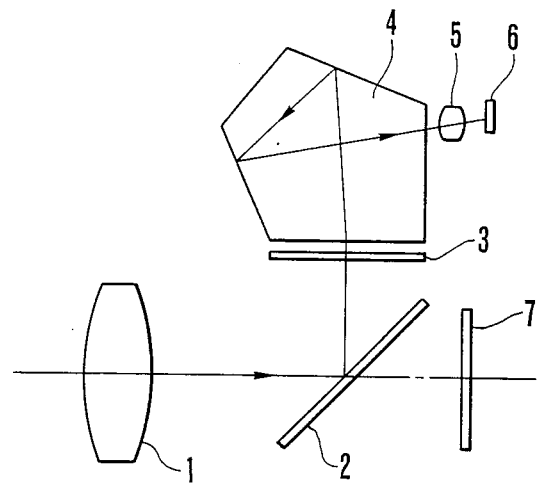
FIG. 1 is a schematic view showing the optical arrangement of a photometric system obtained with this invention applied to a single-lens reflex camera.
Figure 2:
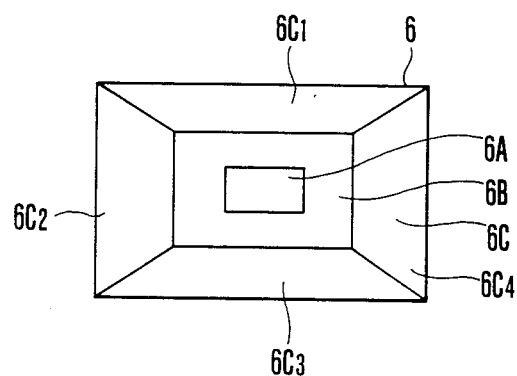
FIG. 2 shows the light receiving surface of a light receiving photosensitive element shown in FIG. 1.

FIG. 1 schematically shows the optical system of a single-lens reflex camera to which this invention is applied. The illustration includes a photo taking lens 1; a quick return mirror 2; a focusing screen 3; a pentagonal prism 4; an image forming lens 5; a light receiving part 6; and an image plane 7. In the case of this embodiment, a light measuring operation is performed by guiding with the image forming lens 5, an object's image formed on the focusing screen 3 to the surface of the light receiving part 6. FIG. 2 shows the light receiving surface of the light receiving part 6 shown in FIG. 1. Referring to FIG. 2, areas 6A and 6B are located approximately in the middle of a photographing field. The area 6B is in a shape surrounding the area 6A. An area 6C is located in the peripheral part of the image plane and is divided into four smaller areas 6C1 to 6C4 which are surrounding the area 6B. In the case of this embodiment, a plurality of light receiving photosensitive elements are positioned to receive light from the six divided areas 6A, 6B, 6C1, 6C2, 6C3 and 6C4 of the field. The luminance of each of these areas is thus arranged to be measured separately from that of another.

Figure 3:
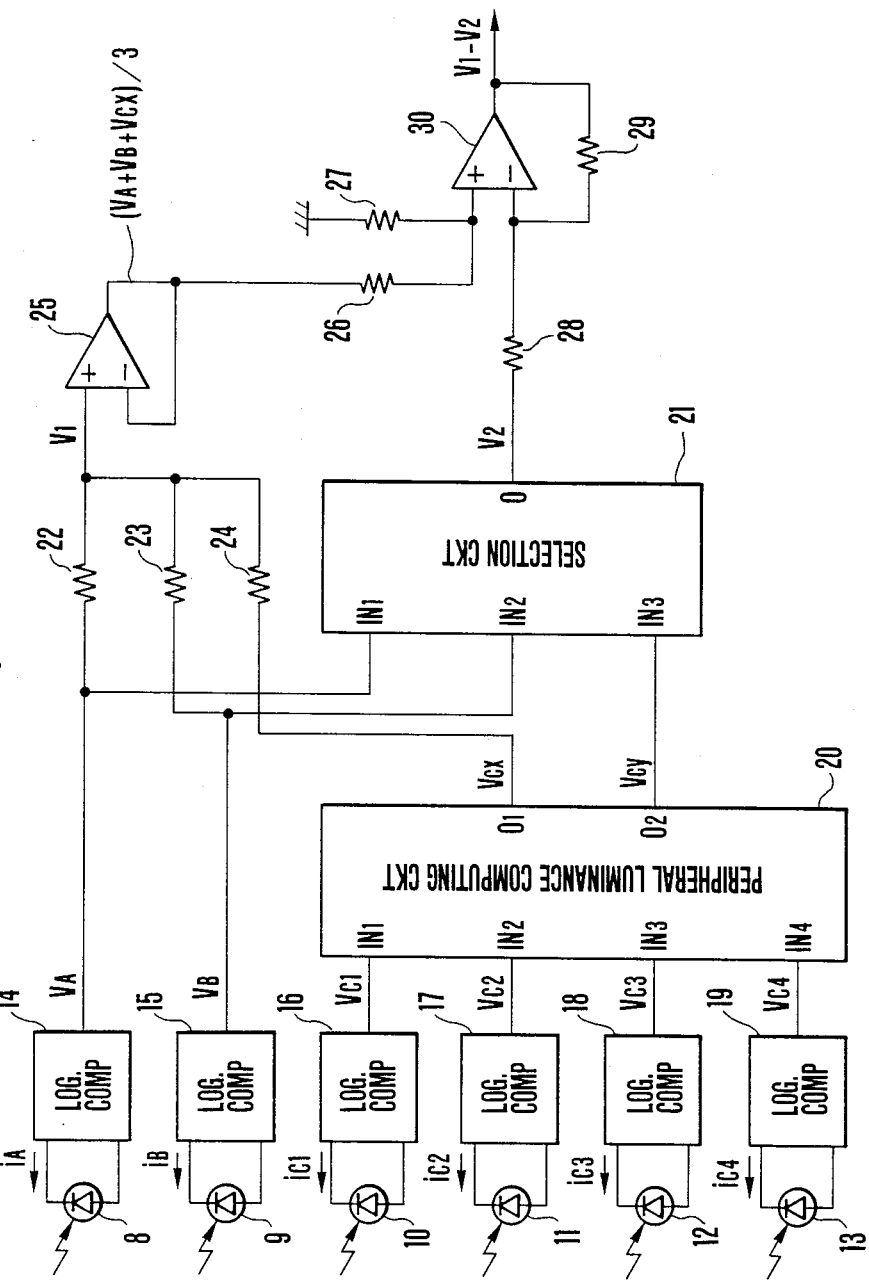
FIG. 3 is a block diagram showing the arrangement of an embodiment of this invention.

FIGS. 3 to 6 show the circuit arrangement of the embodiment. Referring to FIG. 3, silicon photo diodes (SPDs) 8 to 13 are provided for the above stated six areas 6A, 6B and 6C1 to 6C4. These SPDs generate photo currents iA, iB, iC1, iC2, iC3 and iC4 corresponding to the luminance values of these photometric areas. Logarithmic compression circuits 14 to 19 are respectively arranged to logarithmically compress these photo currents and to produce voltages of values VA, VB, VC1, VC2, VC3 and VC4. Using constants a1, a2, a3, a4, a5, a6 ($\geq 0$) and b ($>0$) and the photo currents iA, iB, iC1, iC2, iC3 and iC4, the voltages VA, VB, VC1, VC2, VC3 and VC4 can be expressed as:

$$VA = a1 + b \ln iA \quad VC2 = a4 + b \ln iC2$$
$$VB = a2 + b \ln iB \quad VC3 = a5 + b \ln iC3$$
$$VC1 = a3 + b \ln iC1 \quad VC4 = a6 + b \ln iC4$$

These constants a1, a2, a3, a4, a5 and a6 are preset within the logarithmic compression circuits 14 to 19 in such a way as to give a relation of VA=VB=VC1=VC2=VC3=VC4 when the luminance values of all the areas are equal to each other. A peripheral luminance computing circuit 20 is arranged to receive the voltages VC1, VC2, VC3 and VC4 from the logarithmic compression circuits 16 to 19 at input terminals IN1 to IN4 thereof; to compute the luminance value of the peripheral part 6C of the field; and to produce from its output terminals 01 and 02 voltages VCx and VCy.

Figure 4:
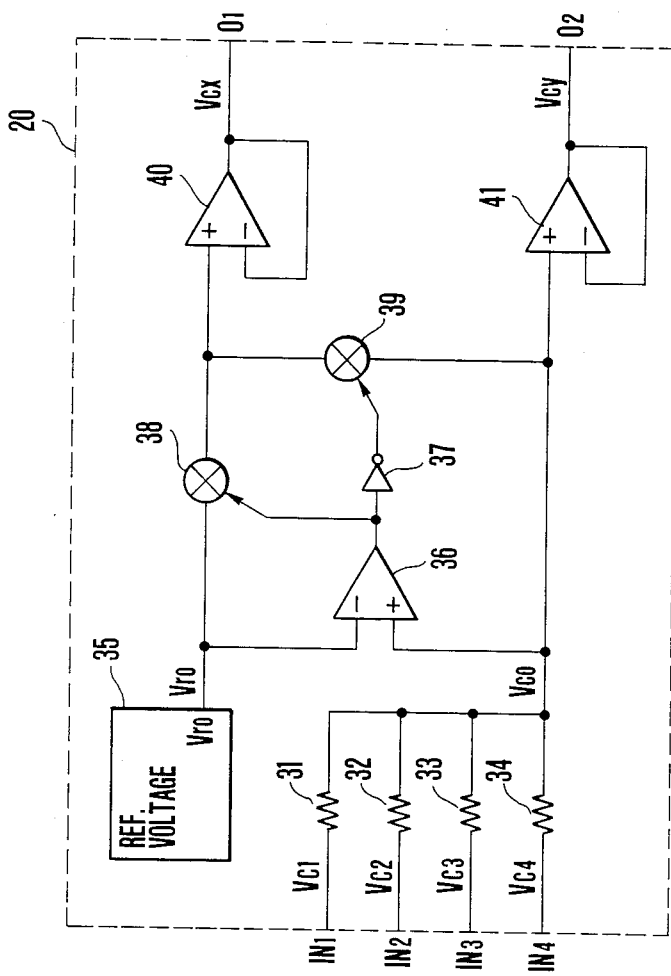
FIG. 4 is a circuit diagram showing by way of example the arrangement of a peripheral luminance computing circuit included in FIG. 3.

FIG. 4 shows the details of arrangement made within the peripheral luminance computing circuit 20. Referring to FIG. 4, resistors 31 to 34 have equal resistance values and are arranged to average the above stated voltages VC1, VC2, VC3 and VC4. The output terminal of the resistor group is arranged to produce a mean voltage value VC0 which can be expressed as: VC0=(VC1+VC2+VC3+VC4)/4.

A reference voltage generating circuit 35 is arranged to generate a reference voltage Vr0, which is used as correction value information in case that the averaged luminance value of the peripheral photometric areas 6C1 to 6C4 of the field is high. A comparator 36 is arranged to compare the mean value VC0 of the voltages VC1, VC2, VC3 and VC4 with the reference voltage Vr0. The comparator 36 produces a high level voltage in the case of VC0≧Vr0 and a low level voltage in the case of VC0<Vr0. A reference numeral 37 denotes an inverter. Numerals 38 and 39 denote analog switches. These analog switches 38 and 39 are arranged to become conductive when voltages applied to their control terminals are at a high level and to open when the voltages are at a low level. The control terminal of the analog switch 38 is arranged to receive the output of the comparator 36 and that of the other analog switch 39 to receive the output of the inverter 37. In the case of VC0≧Vr0, the switch 38 becomes conductive (closes) while the other switch 39 opens. In the event of VC0<Vr0, the switch 38 opens while the other switch 39 closes. Operational amplifiers 40 and 41 respectively have their output terminals connected to their negative input terminals and are thus arranged to serve as voltage followers. Irrespectively of the conditions of the ensuing circuit elements, each of these amplifiers 40 and 41 produces a voltage which is equal to a voltage received at its positive input terminal. The output voltage VCx of the operational amplifier 40 becomes the voltage Vr0 in the case of VC0≧Vr0 and becomes the voltage VC0 in the case of VC0<Vr0. The operational amplifier 40 produces this voltage from an output terminal O1. The other operational amplifier 41 produces a voltage VCy which is the voltage VC0 and is produced from an output terminal O2. With the peripheral luminance computing circuit 20 arranged in this manner, the circuit 20 produces from its output terminal O1 either the mean value of the peripheral luminance of the photographing field or the reference voltage Vr0 as the voltage VCx and produces from another output terminal O2 the mean value VC0 as the voltage VCy respectively.

Again referring to FIG. 3, a selection circuit 21 is arranged to receive the output voltages VA and VB of the logarithmic compression circuits 14 and 15 and the output voltage VCy of the peripheral luminance computing circuit 20 respectively at its input terminals IN1, IN2 and IN3; and to select and determine one of a plurality of computing formulas which will be described later on. Resistors 22, 23 and 24 are arranged to have equal resistance values and to form a mean value circuit. This mean value circuit produces from its output terminal a voltage V1 which can be expressed as: V1=(VA+VB+VCx)/3.

An operational amplifier 25 is arranged to serve as a voltage follower with the output terminal thereof connected to the negative input terminal thereof. The output voltage V1 of the above stated mean value circuit is supplied to the positive input terminal of the operational amplifier 25. The output voltage of the operational amplifier 25 remains the same as the input voltage V1 irrespectively of the conditions of the ensuing circuit elements. A group of resistors 26 to 29 are of equal resistance values and are arranged to form a subtraction circuit in conjunction with an operational amplifier 30. Assuming that the output voltage of the above stated selection circuit 21 is V2, this subtraction circuit produces a voltage V1−V2. In the case of this specific embodiment, this voltage V1−V2 becomes the photometric value which is to be determined by one of a plurality of computing formulas which will be described later herein.

Figure 5:
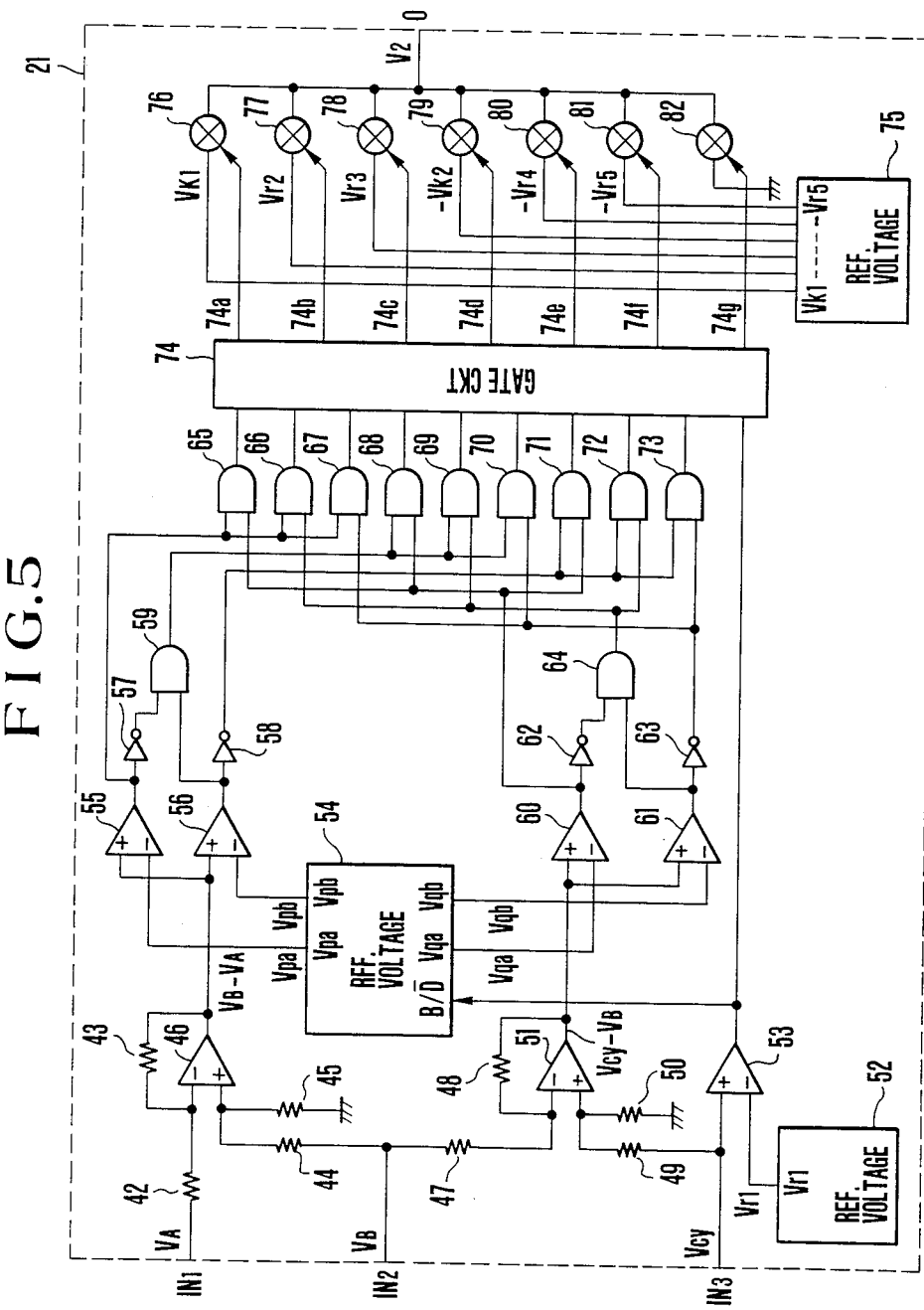
FIG. 5 is a circuit diagram showing by way of example the arrangement of a selection circuit included in FIG. 3.

FIG. 5 shows in a circuit diagram the details of arrangement made within the selection circuit 21 of FIG. 3. Referring to FIG. 5, resistors 42 to 45 are of the same resistance value and are arranged to form a first subtraction circuit in conjunction with an operational amplifier 46. Another group of resistors of the same resistance value likewise forms a second subtraction circuit in conjunction with an operational amplifier 51. The first subtraction circuit is arranged to receive the voltages VA and VB and to produce an output voltage VB−VA. The second subtraction circuit is arranged to receive the voltages VB and VCy and to produce an output voltage VCy−VB. A reference voltage generating circuit 52 is arranged to generate a reference voltage Vr1 which is at a threshold level to be used as a datum in determining whether the photographing field is an indoor field or an outdoor field. The relation between this reference voltage Vr1 and the above stated reference voltage Vr0 is Vr1<Vr0. A comparator 53 is arranged to receive the voltage VCy at its positive input terminal and the reference voltage Vr1 at its negative input terminal. The comparator 53 produces its output at a high level in the case of VCy≧Vr1 which indicates an outdoor field and at a low level in the case of VCy<Vr1 which indicates an indoor field. A reference voltage generating circuit 54 is arranged to generate reference voltages Vpa, Vpb, Vqa and Vqb and has a control terminal B/D̄, which is receiving the output voltage of the above stated comparator 53 as a control voltage. When the control voltage is at a high level, the reference voltages become Vpa=Vp1, Vpb=Vp2, Vqa=Vq1 add Vqb=Vq2 respectively. If the control voltage is at a low level, the reference voltages become Vpa=Vp3, Vpb=Vp4, Vqa=Vq3 and Vqb=Vq4. As for the positive or negative sign of these reference voltages, the reference voltages Vp1, Vp3, Vq1 and Vq3 are positive while the reference voltages Vp2, Vp4, Vq2 and Vq4 are negative. Further, these reference voltages are in the following relations: Vp2<0<Vp1, Vq2<0<Vq1, Vp4<0<Vp3 and Vq4<0<Vq3. Reference numerals 55 and 56 denote comparators; numerals 57 and 58 denote inverters; and 59 denotes an AND gate. The comparators 55 and 56 are arranged to have the output voltage VB−VA of the operational amplifier 46 of the first subtraction circuit supplied to their positive input terminals. To the negative input terminal of the comparator 55 is supplied either the reference voltage Vp1 or Vp3 according to whether the control voltage applied to the control terminal B/$\overline{D}$ of the reference voltage generating circuit 54 is at a high level or at a low level. The negative input terminal of the comparator 56 is likewise arranged to receive either the reference voltage Vp2 or Vp4. Numerals 60 and 61 denote comparators; 62 and 63 inverters; and 64 an AND gate. The comparators 60 and 61 are arranged to receive the output voltage VCy−VB of the operational amplifier 51 of the second subtraction circuit at their positive input terminals. Meanwhile, either the reference voltage Vq1 or Vq3 is supplied to the negative input terminal of the comparator 60 according to whether the control voltage applied to the control terminal B/$\overline{D}$ of the reference voltage generating circuit 54 is at a high level or at a low level. The negative input terminal of the other comparator 61 is likewise arranged to receive either the reference voltage Vq2 or Vq4. Assuming that the positive input terminal voltage of each of these comparators 55, 56, 60 and 61 is V+ and the negative input terminal voltage is V−, each of them produces a high level voltage output in the case of $|V+| \geq |V-|$ and a low level voltage output in the event of $|V+| < |V-|$. The input terminal of the AND gate 59 is connected to the output terminal of the inverter 57 and that of the comparator 56. The comparators 55 and 56, the inverters 57 and 58 and the AND gate 59 are thus arranged to jointly compare the output voltage of the operational amplifier 46 (VB−VA) with the output voltages Vpa and Vpb of the reference voltage generating circuit 54. The level of the output voltage of the comparator 55 becomes high and the levels of the output voltages of the AND gate 59 and the inverter 58 become low in the case of VB−VA≧Vpa. The level of the output voltage of the AND gate 59 becomes high and the levels of the output voltages of the comparator 55 and the inverter 58 become low in the case of Vpb<VB−VA<Vpa. The level of the output of the inverter 58 becomes high and the levels of the output voltages of the comparator 55 and the AND gate 59 become low in the event of VB−VA<Vpb. The AND gate 64 likewise has its input terminals connected to the output terminal of the inverter 62 and that of the comparator 61 and is arranged to compare in conjunction with the comparators 60 and 61 and the inverters 62 and 63 the output voltage (VCy−VB) of the operational amplifier 51 with the two output voltages Vqa and Vqb of the reference voltage generating circuit 54. In the case of VCy−VB≧Vqa, the level of the output voltage of the comparator 60 becomes high and the levels of the output voltages of the AND gate 64 and the inverter 63 become low. In the case of Vqb<VCy−VB<Vqa, the level of the AND gate 64 becomes high while those of the output voltages of the AND gate 60 and the inverter 63 become low. In the event of VCy−VB<Vqb, the output level of the inverter 63 becomes high while those of the comparator 60 and the AND gate 64 become low.

Reference numerals 65 to 73 denote AND gates. One of these AND gates 65 to 73 produces a high level voltage while the rest of them produce low level voltages according to the high- and low-level combinations obtained among the outputs of the comparator 55, the AND gate 59 and the inverter 58 and also obtained among those of the comparator 60, the AND gate 64 and the inverter 63. In other words, one of them produces a high level voltage output according to the level relation between the voltage output (VB−VA) of the operational amplifier 46 and the two voltage outputs Vpa and Vpb of the reference voltage generating circuit 54 and between the voltage output (VCy−VB) of the operational amplifier 51 and the two voltage outputs Vqa and Vqb of the reference voltage generating circuit 54.

A gate circuit 74 consists of a combination of AND and OR gates, etc. as will be further described later. The outputs of the above stated AND gates 65 to 73 are supplied to this gate circuit 74, which then produces signals 74a to 74g for control which will be described later. A reference voltage generating circuit 75 is arranged to generate reference voltages Vk1, Vr2, Vr3, −Vk2, −Vr4 and −Vr5. The reference voltage Vk1 is a correction value to be used for correction in cases where a difference between two luminance values of specific photometric areas exceeds a preset given value when the photographing field is located outdoors. The reference voltage −Vk2 is a correction value to be used when a luminance value exceeding a given value is obtained with the field located indoors. Other reference voltages Vr2, Vr3, −Vr4 and −Vr5 are set at values in the following relation: Vr2>Vr3 and $|Vr4| > |Vr5|$. Numerals 76 to 82 denote analog switches. The switch 76 has the reference voltage Vk1 applied to its input terminal. The switch 77 has the reference voltage Vr2 applied to its input terminal. The switch 78 has the reference voltage Vr3 applied to its input terminal. The switch 79 has the reference voltage −Vk2 applied to its input terminal. The switch 80 has the reference voltage −Vr4 applied to its input terminal. The switch 81 has the reference voltage −Vr5 applied to its input terminal. The input terminal of the switch 82 is at 0 V. The output terminals of these analog switches are interconnected. One of the above stated voltages is thus produced as a correction value V2 from an output terminal O of the selection circuit 21.

Meanwhile, the switch 76 has the signal output 74a of the gate circuit 74 supplied to its control terminal and becomes conductive to allow the reference voltage Vk1 to be produced from the output terminal O when the signal 74a is at a high level. Other analog switches are also likewise arranged. The signal output 74b of the gate circuit 74 is supplied to the control terminal of the switch 77; the signal output 74c to that of the switch 78; the signal output 74d to that of the switch 79; the signal output 74e to that of the switch 80; the signal output 74f to that of the switch 81; and the signal output 74g to that of the switch 82 respectively.

Figure 6:
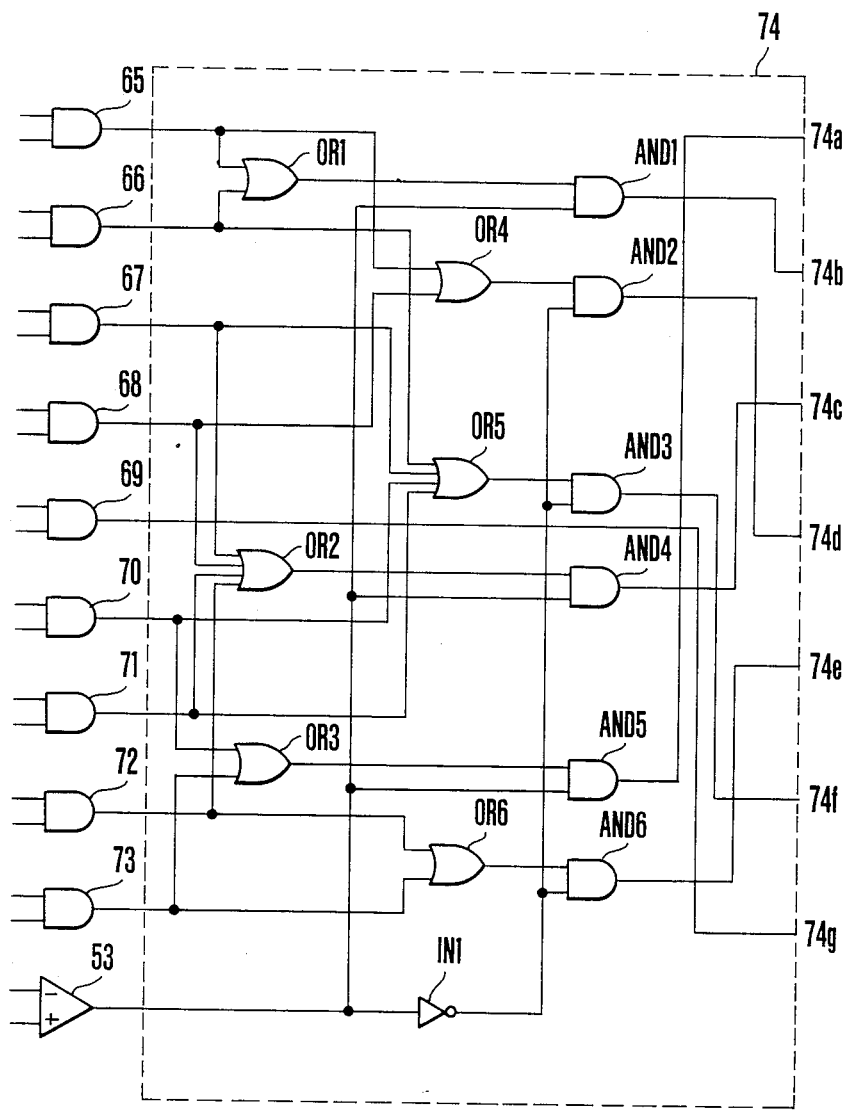
FIG. 6 is a circuit diagram showing by way of example a gate circuit shown in FIG. 5.

The above stated reference voltage generating circuit 75 and the analog switches 76 to 82 jointly form a correction value computing circuit which is arranged to produce outputs corresponding to a plurality of correction constants. The selection circuit 21 is thus arranged to select the correction value V2 by controlling the signal outputs of the gate circuit 74 with the values VA, VB and VCy. FIG. 6 shows by way of example the internal arrangement of the gate circuit 74 of FIG. 5.

Referring to FIG. 6, the gate circuit 74 includes OR gates OR1 to OR6; AND gates AND1 to AND6; and an inverter IN1. In response to the outputs of the above stated AND gates 65 to 73 and that of the comparator 53, the gate circuit 74 produces one of its outputs at a high level voltage. These gates can be combined not only in the manner as shown in FIG. 6 but in other varied manners.

The operation of the embodiment is as follows: The voltage VC0 (hereinafter referred to as a luminance signal) which represents a mean luminance value obtained from the outermost or peripheral photometric areas 6C1 to 6C4 of the field shown in FIG. 2 is compared by the comparator 36 of the peripheral luminance computing circuit 20 with the reference voltage Vr0 shown in FIG. 4. In the case of VC0≧Vr0, the circuit 20 produces the reference voltage Vr0 a an output voltage VCx from its output terminal O1, irrespectively of the mean luminance signal, in such a manner as to ensure an adequate exposure even in the event of photographing, for example, a white object under a clear sky. In the event of VC0<Vr0, the mean luminance signal VC0 is produced as the output voltage VCx to be supplied to the mean value circuit consisting of the resistors 22 to 24. Therefore, the voltage V1 which is (VA+VB+VCx)/3 and is produced via the mean value circuit from the operational amplifier 25 is at the value of (VA+VB+Vr0)/3 when the luminance of the outermost area 6C is very high and is at the value of (VA+VB+VC0)/3 when the luminance of the area 6C is lower than the reference voltage Vr0. Then, a photometric output which corresponds to the luminance of the field is obtained by using, along with the output of the operational amplifier 25, a correction value V2 which is produced from the selection circuit 21. Further, in either case, the mean luminance signal VC0 is produced as the output voltage VCy from the output terminal O2 of the peripheral luminance computing circuit 20.

The photometric value computing operations of the circuits of FIGS. 3 and 5 are as described below with reference to FIGS. 7 to 9:

(1) In case that the mean luminance signal VC0 which represents the mean luminance value of the outermost areas 6C1 to 6C4 and is produced from the output terminal O2 of the peripheral luminance computing circuit 20 is larger than the reference voltage Vr1 produced from the reference voltage generating circuit 52 included in the selection circuit 21 (in this instance. the output voltage VCx which is to be produced from the other output terminal O1 of the circuit 20 is either the reference voltage Vr0, if the peripheral luminance is considerably high, or, if not, is the mean luminance signal VC0) or in the case of VCy≧Vr1 where the photographing field is considered to be located outdoors, with a bright object in the background to make the peripheral part of the image plane bright, a photometric output (V1−V2) is obtained through the following operation with the reference voltages Vp1, Vp2, Vq1 and Vq2 used as constants according to the luminance signal differences (VB−VA) and (VCy−VB): The luminance signal difference (VB−VA) hereinafter will be referred to as a luminance signal difference ΔBA and the luminance signal difference (VCy−VB) as a difference ΔCyB.

$$\text{In the case of}\begin{bmatrix} Vp2 & < & \Delta BA & < & Vp1 \\ Vq1 & < & \Delta CyB & & \end{bmatrix} \quad (1\text{-}1)$$

FIG. 7(a) represents this condition. As shown, the luminance signal difference ΔBA between the central area 6A and the middle area 6B around the area 6A becomes small. The luminance signal difference ΔCyB between the area 6B and the outermost (peripheral) area 6C is large. In this instance, a main object can be assumed to be located in both the areas 6A and 6B. To give an exposure apposite to the main object, the photometric output (V1−V2) is computed according to the following formula with the reference voltage Vr3 used as a correction value:

$$V1-V2=(VA+VB+VCx)/3-Vr3$$

In this case, the circuit operation is as follows: In the selection circuit 21 of FIG. 5, the comparator 53 produces a high level output as the luminance signal VCy for the outermost area 6C is larger than the reference voltage Vr1. Therefore, a high level signal is supplied to the control terminal B/$\overline{D}$ of the reference voltage generating circuit 54. The circuit 54 comes to produce reference voltages Vpa=Vp1, Vpb=Vp2, Vqa=Vq1 and Vqb=Vq2. Meanwhile, the output voltage (VA−VB) of the operational amplifier 46 comes to satisfy the condition of Vp2<ΔBA<Vp1. This makes the output level of the comparator 55 low and that of the comparator 56 high. As a result, the output level of the AND gate 59 becomes high. The output voltage (VCy−VB) of the operational amplifier 51 comes to meet the condition of Vq1<ΔCyB. Therefore, the output level of the comparator 60 becomes high. Accordingly, the output level of the AND gate 68 alone becomes high among those of others. The gate circuit 74 then makes only the level of its output signal 74c high according to the high level output of the AND gate 68, the low level outputs of the AND gates 65 to 67 and 69 to 73 and high level output of the comparator 53. Meanwhile, the levels of other output signals 74a, 74b and 74d to 74g of the gate circuit 74 become low. Then, the reference voltage Vr3 is selected and produced from the output terminal O as the correction value V2. As a result, the voltage (VA+VB+VCx)/3 produced from the operational amplifier 25 of FIG. 3 is supplied to the positive input terminal of the operational amplifier 30 while the reference voltage Vr3 is supplied to the negative input terminal of the operational amplifier 30. The operational amplifier 30 then produces the photometric output (V1−V2) at a voltage value obtained according to the computing formula (VA+VB+VCx)/3−Vr3 which is shown above.

$$\text{In the case of}\begin{bmatrix} Vp2 & < & \Delta BA \\ Vq1 & < & \Delta CyB \end{bmatrix} \quad (1\text{-}2)$$

This condition is as shown in FIG. 7(b). The luminance signal difference ABA between the areas 6A and 6B is larger than the given positive value Vp1. The luminance signal difference ΔCyB between the areas 6B and 6C is also larger than the given positive value Vq1. This condition thus suggests a scene where a main object is likely located in the whole of the area 6A and a part of the area 6B. In this case, the photometric output (V1−V2) is obtained in accordance with the following formula with the reference value Vr2 (Vr2 > Vr3) used as the correction value V2:

$$V1 - V2 = (VA + VB + VCx)/3 - Vr2$$

The circuit operation in this case is as follows: All the comparators 53, 55, 56, 60 and 61 produce high level outputs. The AND gate 65 alone produces a high level output while other AND gates 66 to 73 produce low level outputs. Accordingly, the gate circuit 74, upon receipt of the outputs of the comparator 53 and the AND gates 65 to 73, makes the level of its output signal 74b high and the levels of other output signals 74a and 74c to 74g low. As a result, the photometric output (V1−V2) of the operational amplifier 30 becomes a voltage value which can be expressed as (VA+VB+VCx)/3−Vr2.

In the case of $\begin{bmatrix} Vp1 & < & \Delta BA & \\ Vq2 & < & \Delta CyB & < & Vq1 \end{bmatrix}$ (1-3)

FIG. 7(c) shows this condition. As shown, the luminance signal difference ΔBA between the areas 6A and 6B is larger than the given positive value Vp1. The luminance signal difference ΔCyB between the areas 6B and 6C is small. This suggests a scene where a main object is likely located in the whole of the area 6A or is very small in size. To give an exposure apposite to the main object part, the photometric output (V1−V2) is obtained, like in the above stated case (1-2), in accordance with the following computing formula with the value Vr2 used as the correction value V2:

$$V1 - V2 = (VA + VB + VCx)/3 - Vr2$$

The circuit operation for the above: The comparators 53, 55 and 61 produce high level outputs. The comparator 60 produces a low level output. The AND gate 64 produces a high level output. The AND gate 66 also produces a high level output. Other AND gates 65 and 67 to 73 produce low level outputs. Upon receipt of the output of the comparator 53 and those of the AND gates 65 to 73, the gate circuit 74 produces the output signal 74b at a high level, the output signals 74a and 74c to 74g at low levels. As a result, the photometric output (V1−V2) of the operational amplifier 30 becomes a voltage of (VA+VB+VCx)/3−Vr2.

In the case of $\begin{bmatrix} Vp1 & < & \Delta BA \\ \Delta CyB & < & Vq2 \end{bmatrix}$ (1-4)

FIG. 7(d) shows this condition. As shown, the luminance signal difference ΔBA between the areas 6A and 6B is larger than the given positive value Vp1. Meanwhile, the luminance signal difference ΔCyB between the areas 6B and 6C is smaller than the given negative value Vq2. This suggests a scene where a main object is about the same size as in the above stated case (1-3) and have an object of a high degree of luminance, such as the sun, a reflecting sea surface or the like; or a landscape or the like where an object of a considerably high degree of luminance is located in the area 6B. In this case, the photometric output (V1−V2) is obtained in accordance with the following computing formula with the value Vr3 used as the correction value V2, like in the case (1-1) above:

$$V1 - V2 = (VA + VB + VCx)/3 - Vr3$$

The circuit operation for this: The comparators 53, 55 and 56 produce high level outputs. The comparators 60 and 61 produce low level outputs. Therefore, the AND gate 67 produces a high level output. Other AND gates 65, 66 and 68 to 73 produce low level outputs. Then, receiving the output of the comparator 53 and those of the AND gates 65 to 73, the gate circuit 74 produces the output signal 74c at a high level and the output signals 74a, 74b and 74d to 74g at low levels. As a result, the photometric output (V1−V2) of the operational amplifier 30 becomes a voltage which can be expressed as (VA+VB+VCx)/3−Vr3.

In the case of $\begin{bmatrix} Vp2 & < & \Delta BA & < & Vp1 \\ \Delta CyB & < & Vq2 \end{bmatrix}$ (1-5)

This condition is as shown in FIG. 7(e). The luminance signal difference ΔBA between the areas 6A and 6B is smaller than the given positive value Vp1, while the luminance signal difference ΔCyB between the areas 6B and 6C is larger in absolute value than the given negative value Vq2. This suggests a scene where a main object is large existing in both the areas 6A and 6B and can be assumed to be whitish in color. Under such a condition, it is preferable to give such an exposure that highlights the main object. In view of that, the photometric output (V1−V2) is obtained from the following computing formula with the value Vk1 used as the correction value V2:

$$V1 - V2 = (VA + VB + VCx)/3 - Vk1$$

The circuit operation for the above: The comparators 53 and 56 produce high level outputs. The AND gate 59 produces a high level output. The comparators 55, 60 and 61 produce low level outputs. This causes the AND gate 70 to produce a high level output. Other AND gates 65 to 69 and 71 to 73 produce low level outputs. Accordingly, upon receipt of the output of the comparator 53 and those of the AND gates 65 to 73, the gate circuit 74 produces the output signal 74a at a high level and the output signals 74b to 74g at low levels. As a result, the photometric output (V1−V2) of the operational amplifier 30 becomes a voltage which can be expressed as (VA+VB+VCx)/3−Vk1.

In the case of $\begin{bmatrix} \Delta BA & < & Vp2 \\ \Delta CyB & < & Vq2 \end{bmatrix}$ (1-6)

This condition is as shown in FIG. 7(f). The luminance signal difference ΔBA between the areas 6A and 6B is a negative value and is larger in absolute value than the given value Vp2. Meanwhile, the luminance signal difference ΔCyB between the areas 6B and 6C is also a negative value and is larger than the given value Vq2. This suggests an object which is of medium size located in the area 6A and a part of the area 6B and is whitish in color. In this case, the main object part is preferably to be highlighted like in the case (1-5) above. Therefore, the photometric output (V1−V2) is computed in accordance with the following formula with the value Vk1 used as the correction value V2:

$$V1-V2=(VA+VB+VCx)/3-Vk1$$

The circuit operation for the above: The comparator 53 produces a high level output. Meanwhile, the comparators 55, 56, 60 and 61 produce low level outputs. The AND gate 73 produces a high level output. Other AND gates 65 to 72 produce low level outputs. Then, receiving the output of the comparator 53 and those of the AND gates 65 to 73, the gate circuit 74 produces the output signal 74a at a high level and the output signals 74b to 74g at low levels. As a result the operational amplifier 30 comes to produce the photometric output (V1−V2) at a voltage value of (VA+VB+VCx)/3−Vk1.

$$\text{In the case of} \begin{bmatrix} \Delta BA & < & Vp2 \\ Vq2 & < & \Delta CyB & < & Vq1 \end{bmatrix} \quad (1\text{-}7)$$

FIG. 7(g) shows this condition. As shown, the luminance signal difference ΔBA between the areas 6A and 6B is a negative value which is larger in absolute value than the given value Vp2. The luminance signal difference ΔCyB between the areas 6B and 6C is small. This suggests either a main object occupying the whole area 6A or a small whitish main object. In this case, the photometric output (V1−V2) is computed according to the following formula using the value Vr3 as the correction value V2 for highlighting the main object like in the case (1-1):

$$V1-V2=(VA+VB+VCx)/3-Vr3$$

The circuit operation for the above: The comparators 53 and 61 produce high level outputs. The AND gate 64 produces a high level output. The comparators 55, 56 and 60 produce low level outputs. The AND gate 72 therefore produces a high level output. Other AND gates 65 to 71 and 73 produce low level outputs. Upon receipt of the outputs of the comparator 53 and the AND gates 65 to 73, the gate circuit 74 produces the output signal 74c at a high level and the output signals 74a, 74b and 74d to 74g at low levels. As a result, the operational amplifier 30 produces the photometric output (V1−V2) at a voltage value of (VA+VB+VCx)/3−Vr3.

$$\text{In the case of} \begin{bmatrix} \Delta BA & < & Vp2 \\ Vq1 & < & \Delta CyB \end{bmatrix}$$

FIG. 7(h) shows the above. The luminance signal difference ΔBA between the areas 6A and 6B is of a negative value larger in absolute value than the given value Vp2. The luminance signal difference ΔCyB between the areas 6B and 6C is larger than the given value Vq1. This suggests either a scene where a main object is of about the same size as in the case (1-1) above and consists of bright and dark parts with the area 6A having a relatively high degree of luminance; or a landscape where the area 6B is occupied by some object of a considerably low degree of luminance. In this instance, the photometric output (V1−V2) is computed in accordance with the following formula with the value Vr3 used as the correction value V2 in the same manner as in the case (1-1):

$$V1-V2=(VA+VB+VCx)/3-Vr3$$

The circuit operation for the above: The comparators 53, 60 and 61 produce high level outputs. The AND gate 64 produces a high level output. The comparators 55 and 56 produce low level outputs. The AND gate 71 therefore produces a high level output. Other AND gates 65 to 70, 72 and 73 then produce low level outputs. Receiving the outputs of the comparator 53, the AND gates 65 to 73, the gate circuit 74 produces the output signal 74c at a high level and the output signals 74a, 74b and 74d to 74g at low levels. As a result, the photometric output (V1−V2) from the operational amplifier 30 becomes a voltage value of (VA+VB+VCx)/3Vr3.

$$\text{In the case of} \begin{bmatrix} Vp2 & < & \Delta BA & < & Vp1 \\ Vq2 & < & \Delta CyB & < & Vq1 \end{bmatrix} \quad (1\text{-}9)$$

FIG. 7(i) shows this condition. The luminance signal difference ΔBA between the areas 6A and 6B is small and the other luminance signal difference ΔCyB between the areas 6B and 6C is also small. This suggests either a scene where the whole photographing field is occupied by a main object or a landscape or the like including nothing to be regarded as a main object. In this case, the photometric output (V1−V2) is computed in accordance with the following formula with zero used for the correction value V2:

$$V1-V2=(VA+VB+VCx)/3$$

The circuit operation for the above: The comparators 53, 56 and 61 produce high level outputs. The comparators 55 and 60 produce low level output. The AND gates 59 and 64 both produce high level outputs. This causes the AND gate 69 to produce a high level output. Other AND gates 65 to 68 and 70 to 73 produce low level outputs. Then, receiving the outputs of the comparator 53 and the AND gates 65 to 73, the gate circuit 74 produces the output signal 74g thereof at a high level and other output signals 74a to 74f at low levels. As a result, the photometric output (V1−V2) of the operational amplifier 30 is produced at a voltage value of (VA+VB+VCx)/3.

Figure 8A:
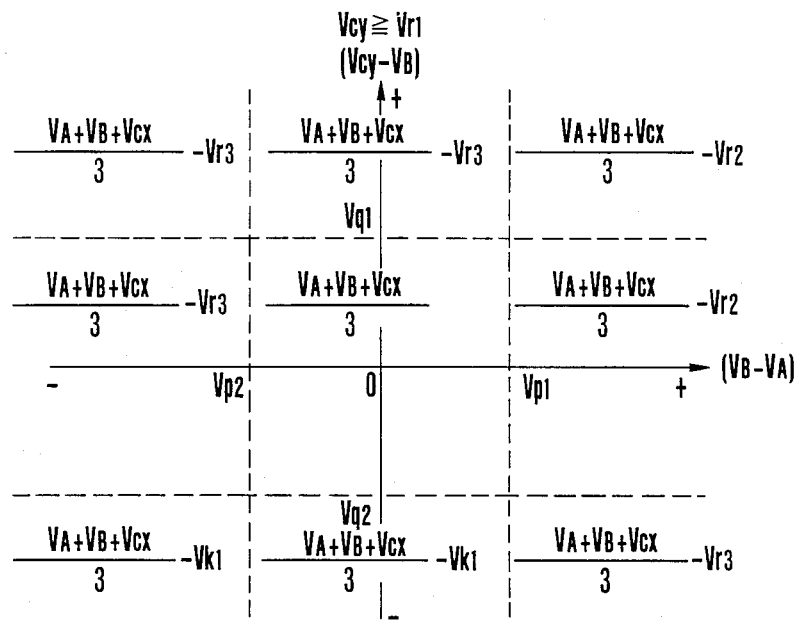
Figure 8B:
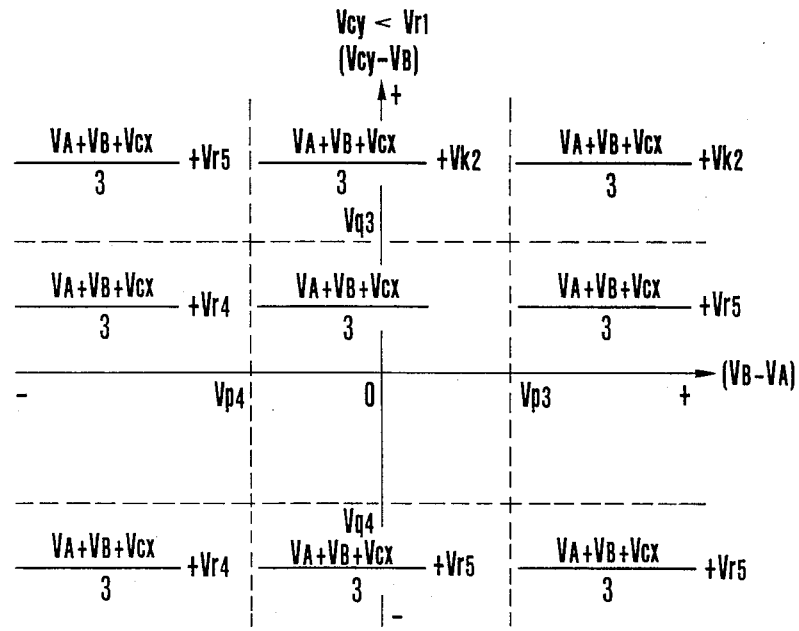

While FIGS. 7(a) to 7(i) show in bar graphs the luminance levels of the photometric areas 6A, 6B and 6C, FIG. 8(a) shows the interrelation of the computing formulas to be selected according to varied luminance conditions as described in the foregoing paragraphs (1-1) to (1-9).

(2) In case that the mean luminance signal VCy which represents the outermost area 6C of the photographing field 6 shown in FIG. 2, i.e. the output voltage VC0 produced from the output terminal O2 of the peripheral luminance computing circuit 20, is smaller than the reference voltage Vr1, the output voltage VCx which is produced from the other output terminal O1 of the circuit 20 is also at the same value VC0. In other words, in the case of VCy<Vr1, the photographing scene is assumed to be an indoor scene having a wall or the like located in the background. Under this condition, the photometric value (V1−V2) is obtained by one of the following operations using the different constants Vp3, Vp4, Vq3 and Vq4 in accordance with the values of the luminance signal differences ΔBA and ΔCyB like in the cases of Paragraph (1) above:

$$\text{In the case of } \begin{bmatrix} Vp4 < \Delta BA < Vp3 \\ Vq3 < \Delta CyB \end{bmatrix} \quad (2\text{-}1)$$

Figures 9A, 9B, 9H:
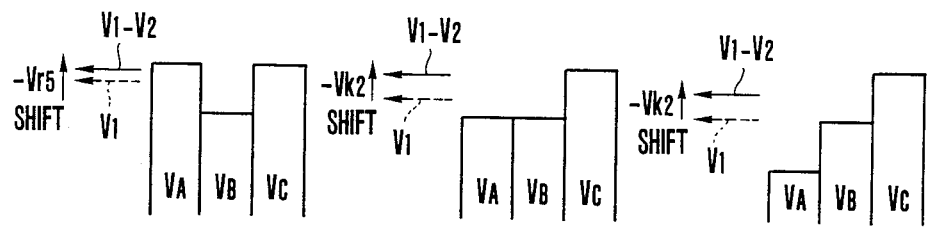

FIG. 9(a) illustrates the above condition. In this case, the luminance signal difference ΔBA between the areas 6A and 6B is small. The other luminance signal difference ΔCyB between the areas 6B and 6C is larger than the given value Vq3. This condition suggests a scene where a main object to be photographed is large enough to be located in both the areas 6A and 6B and may be assumed to be blackish in color. In this case, it is preferable to make such an exposure that shadow depicts the main object part. Therefore, the photometric output (V1−V2) is computed in accordance with the following formula with the value (−Vk2) used as the correction value V2:

$$V1-V2 = (VA+VB+VCx)/3 + Vk2$$

The circuit operation in this case performed as follows: Since the mean luminance signal VCy of the outermost area 6C is less than the reference voltage Vr1, the comparator 53 produces a low level output. Therefore, a low level signal is supplied to the control terminal B/$\overline{D}$ of the reference voltage generating circuit 54. This causes the reference voltages of the circuit 54 to be Vpa=Vp3, Vpb=Vp4, Vqa=Vq3 and Vqb=Vq4. Meanwhile, the comparator 55 produces a low level output. The comparators 56, 60 and 61 produce high level outputs. The AND gate 59 produces a high level output to cause the AND gate 68 to produce also a high level output. Other AND gates 65 to 67 and 69 to 73 all produce low level outputs. The output of the comparator 53 and those of the AND gates 65 to 73 are supplied to the gate circuit 74 to cause it to produce the output signal 74d at a high level and the output signals 74a to 74c and 74e to 74g thereof at low levels. Since the output voltage of the operational amplifier 25 is (VA+VB+VCx)/3 as mentioned above, the photometric output (V1−V2) of the operational amplifier 30 becomes a voltage value of (VA+VB+VCx)/3+Vk2.

$$\text{In the case of } \begin{bmatrix} Vp3 < \Delta BA \\ Vqa < \Delta CyB \end{bmatrix} \quad (2\text{-}2)$$

FIG. 9(b) shows the above condition. The luminance signal difference ΔBA between the areas 6A and 6B is larger than the given value Vp3. The luminance signal difference ΔCyB between the areas 6B and 6C is also larger than the given value Vq3. This suggests a scene where a blackish main object occupies the whole of the area 6A and a part of the area 6B. In this case, in order to make a shadow depicting exposure, like in the case (2-1) above, the photometric output (V1−V2) is computed in accordance with the following formula with the value (−Vk2) used as the correction value V2:

$$V1-V2 = (VA+VB+VCx)/3 + Vk2$$

The circuit operation for the above: The comparator 53 produces a low level output. The comparators 55, 56, 60 and 61 all produce high level outputs. The AND gate 65 produces a high level output. Other AND gates 66 to 73 produce low level outputs. The gate circuit 74 receives the output of the comparator 53 and those of the AND gates 65 to 73 and produces the output signal 74d thereof at a high level and other output signals thereof at low levels. As a result, the operational amplifier 30 produces the photometric output (V1−V2) at a voltage value of (VA+VB+VCx)/3+Vk2.

$$\text{In the case of } \begin{bmatrix} Vp3 < \Delta BA \\ Vq4 < \Delta CyB < Vq3 \end{bmatrix} \quad (2\text{-}3)$$

Figures 9C, 9G, 9I:
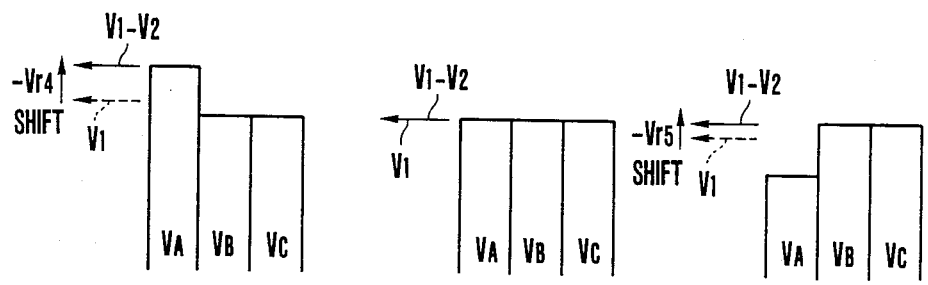

FIG. 9(c) shows the above condition. As shown, the luminance signal difference ΔBA between the areas 6A and 6B is larger than the given value Vp3 while the other luminance signal difference ΔCyB between the areas 6B and 6C is small. This suggests a scene where a blackish main object occupies the whole area 6A or is small in size. In this instance, it is preferable to make such an exposure that shadow depicts the main object part of the scene. The photometric output (V1−V2) is therefore computed in accordance with the following formula with the value (−Vr5) used as the correction value V2:

$$V1-V2 = (VA+VB+VCx)/3 + Vr5$$

The circuit operation for the above: The comparators 53 and 60 produce low level outputs. The comparators 55, 56 and 61 produce high level outputs. The AND gate 64 produces a high level output to cause the AND gate 66 to produce also a high level output. Other AND gates 65 and 67 to 73 produce low level outputs. Then, receiving the outputs of the comparator 53 and the AND gates 65 to 73, the gate circuit 74 produces its output signal 74f at a high level and other output signals 74a to 74e and 74g at low levels. As a result, the photometric output (V1−V2) of the operational amplifier 30 becomes a voltage value of (VA+VB+VCx)/3+Vr5.

$$\text{In the case of } \begin{bmatrix} Vp3 < \Delta BA \\ \Delta CyB < Vq4 \end{bmatrix} \quad (2\text{-}4)$$

Figures 9D, 9E, 9F:
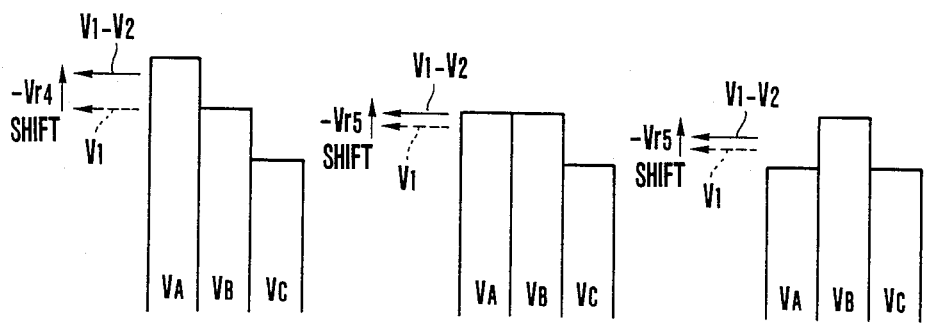

FIG. 9(d) shows this condition. The luminance signal difference ΔBA between the areas 6A and 6B is larger than the given value Vp3. Meanwhile the other luminance signal difference ΔCyB between the areas 6B and 6C is a negative value larger in absolute value than the given value Vq4. This indicates a scene where a main object is blackish in color and is of about the same size as in the above stated case (2-3) with an object of a relative high degree of luminance, such as an electric light, located within the area 6B. In the event of an indoor scene with an object of a high degree of luminance in the area 6B like in this case, data obtained in the past indicates that the high degree of luminance in the area 6B has less adverse effect for an indoor scene than for an outdoor scene having the sun or the like in the area 6B. In this instance, therefore, the photometric output (V1−V2) is computed in accordance with the following formula using the value −Vr5 as the correction value V2 in the same manner as in the case (2-2) above:

$$V1-V2=(VA+VB+VCx)/3+Vr5$$

The circuit operation for the above: The comparators 53, 60 and 61 produce low level outputs while the comparators 55 and 56 produce high level outputs. The AND gate 67 therefore produces a high level output. Other AND gates 65, 66 and 68 to 73 produce low level outputs. The gate circuit 74 receives the outputs of the comparator 53 and the AND gates 65 to 73 and produces the output signal 74f at a high level and other output signals 74a to 74e and 74g at low levels. Then, the operational amplifier 30 produces the photometric output (V1−V2) at a voltage value of (VA+VB+VCx)/3+Vr5

$$\text{In the case of} \begin{bmatrix} Vp4 & < & \Delta BA & < & Vp3 \\ \Delta CyB & < & Vq4 & & \end{bmatrix} \quad (2\text{-}5)$$

FIG. 9(e) shows the above. The luminance signal difference ΔBA between the areas 6A and 6B is small while the luminance signal difference ΔCyB between the areas 6B and 6C is larger in absolute value than the negative given value Vq4. This indicates a scene where a main object is in both the areas 6A and 6B with the areas 6A and 6B alone illuminated with a light. In this case, the photometric output (V1−V2) is obtained from the following computing formula using the value −Vr5 as the correction value V2 like in the above stated case (2-3):

$$V1-V2=(VA+VB+VCx)/3+Vr5$$

The circuit operation for the above: The comparators 53, 55, 60 and 61 produce low level outputs while the comparator 56 alone produce a high level output. The AND gate 59 produces a high level output. This causes the AND gate 70 to produce a high level output. Other AND gates 65 to 69 and 71 to 73 produce low level outputs. Then, receiving the outputs of the comparator 53 and the AND gates 65 to 73, the gate circuit 74 produces its output signal 74f at a high level and other output signals at low levels. As a result, the operational amplifier 30 produces the photometric output (V1−V2) at a voltage value of (VA+VB+VCx)/3+Vr5.

$$\text{In the case of} \begin{bmatrix} \Delta BA & < & Vp4 \\ \Delta CyB & < & Vq4 \end{bmatrix} \quad (2\text{-}6)$$

FIG. 9(f) shows the above. The luminance signal difference ΔBA between the areas 6A and 6B is larger in absolute value than the negative given value Vp4. The luminance signal difference ΔCyB between the areas 6B and 6C is also larger in absolute value than the negative given value Vq4. This condition suggests a main object occupying the whole of the area 6A and a part of the area 6B with the whole area 6A and the part of the area 6B illuminated with a light. In order to give an exposure apposite to the main object in this case, use of a larger correction value than in the case (2-5) is necessary. Hence, the photometric output (V1−V2) is computed in accordance with the following formula by using the value −Vr4 as the correction value V2:

$$V1-V2=(VA+VB+VCx)/3+Vr4$$

The circuit operation: The comparators 53, 55, 56, 60 and 61 all produce low level outputs. The AND gate 73, therefore, produces a high level output while other AND gates 65 to 72 produce low outputs. Then, receiving the outputs of the comparator 53 and the AND gates 65 to 73, the gate circuit 74 produces the output signal 74e at a high level and other output signals 74a to 74d, 74f and 74g thereof at low level. As a result, the operational amplifier 30 produces the photometric output (V1−V2) at a voltage value of (VA+VB+VCx)/3+Vr4.

$$\text{In the case of} \begin{bmatrix} \Delta BA & < & Vp4 & & \\ Vq4 & < & \Delta CyB & < & Vq3 \end{bmatrix} \quad (2\text{-}7)$$

FIG. 9(g) shows the above. The luminance signal difference ΔBA between the areas 6A and 6B is larger in absolute value than the negative given value Vp4. The luminance signal difference ΔCyB between the areas 6B and 6C is small. This suggests a scene where a main object occupies the whole area 6A or is small locating in a part of the area 6A. In this instance, in order to give an exposure apposite to the main object part, the photometric output (V1−V2) is computed according to the following formula using the value −Vr4 as the correction value V2 like in the above stated case (2-6):

$$V1-V2=(VA+VB+VCx)/3+Vr4$$

The circuit operation: The comparators 53, 55, 56 and 60 produce low level output while the comparator 61 produces a high level output. The AND gate 64 produces a high level output. The AND gate 72, therefore, produces also a high level output. Other AND gates 65 to 71 and 73 produce low level outputs. Then, receiving the outputs of the comparator 53 and the AND gates 65 to 73, the gate circuit 74 produces its output signal 74e at a high level and other output signals 74a to 74d, 74f and 74g at low levels. As a result, the photometric output (V1−V2) of the operational amplifier 30 becomes a voltage value of (VA+VB+VCx)/3+Vr4.

$$\text{In the case of} \begin{bmatrix} \Delta BA & < & Vp4 \\ Vq3 & < & \Delta CyB \end{bmatrix} \quad (2\text{-}8)$$

FIG. 9(h) shows the above: The luminance signal difference ΔBA between the areas 6A and 6B is larger in absolute value than the negative given value Vp4. The luminance signal difference ΔCyB is larger than the given value Vq3. This suggests a scene where the whole area 6A is occupied by a main object; or a scene where the main object is of about the same size as in the above stated case (2-1) and consists of bright and dark parts to make the area 6A somewhat brighter while the scene as a whole is a blackish object; or a landscape or the like with the area 6B being occupied by an object of a very low degree of luminance. In this instance, the photometric output (V1−V2) is computed in accordance with the following formula using the value −Vr5 as the correction value V2 in the same manner as in the case (2-3) above:

$$V1-V2=(VA+VB+VCx)/3+Vr5$$

The circuit operation for the above: The comparators 53, 55 and 56 produce low level outputs. The comparators 60 and 61 produce high level outputs. The AND gate 71, therefore, produces a high level output while other AND gates 65 to 70, 72 and 73 produce low level outputs. Therefore, upon receipt of these outputs of the comparator 53 and the AND gates 65 to 73, the gate circuit 74 produces its output signal 74$f$ at a high level and other output signals at low levels. As a result, the operational amplifier 30 produces the photometric output $(V1-V2)$ at a voltage value of $(VA+VB+VCx)/3+Vr5$.

$$\text{In the case of} \begin{bmatrix} \Delta BA & < & Vp4 \\ Vq3 & < & \Delta CyB \end{bmatrix} \quad (2\text{-}9)$$

FIG. 9($i$) shows the above. The luminance signal difference $\Delta BA$ between the areas 6A and 6B is small and the difference $\Delta CyB$ is also small. The condition suggests a scene where the whole photographing field is occupied by a main object or a landscape having nothing to be regarded as a main object in particular. In this instance, to give an exposure apposite to the whole field including all the areas 6A, 6B and 6C, the photometric output $(V1-V2)$ is computed in accordance with the following formula using zero as the correction value V2:

$$V1-V2=(VA+VB+VCx)/3$$

The circuit operation for the above: The comparators 53, 55 and 60 produce low level outputs while other comparators 56 and 61 produce high level outputs. The AND gates 59 and 64 both produce high level outputs to cause the AND gate 69 to produce also a high level output. Other AND gates 65 to 68 and 71 to 73 produce low level outputs. Then, receiving these outputs of the comparator 53 and the AND gates 65 to 73, the gate circuit 74 produce its output signal 74$g$ at a high level and other output signals 74$a$ to 74$e$ at low levels. As a result, the operational amplifier 30 produces the photometric output $(V1-V2)$ at a voltage value of $(VA+VB+VCx)/3$.

FIGS. 9($a$) to 9($i$) show in bar graphs the luminance levels of the photometric areas 6A, 6B and 6C. FIG. 8($b$) shows the interrelation of the computing formulas selected according to the different luminance conditions described in the foregoing paragraphs (2-1) to (-9) with reference to the FIGS. 9($a$) to 9($i$).

In another embodiment of this invention, the peripheral luminance computing circuit 20 of FIG. 3 is differently arranged from the arrangement shown in FIG. 4. FIG. 10 shows the differently arranged circuit 20. Referring to FIG. 10, a reference voltage generating circuit 131 is arranged to generate a reference voltage Vr7 which is equivalent to the reference voltage Vr0 generated by the reference voltage generating circuit 35 of FIG. 4. Comparators 132, 133, 134 and 135 are arranged to receive the reference voltage Vr7 at their positive input terminals from the reference voltage generating circuit 131. Meanwhile, their negative input terminals are arranged to receive the output voltages of the logarithmic compression circuits 16 to 19 which are the luminance signals VC1 to VC4 respectively. Each of these comparators 132 to 135 thus compares these input signals. Inverters 136, 137, 138 and 139 have their input terminals connected to the output terminals of the comparators 132 to 135. Analog switches 140 to 147 are arranged to become conductive when voltages applied to their control terminals are at high levels and to be in open states when these voltages are at low levels. The control terminal of the switch 140 is arranged to receive the output of the comparator 132; that of the switch 141 to receive the output of the comparator 133; that of the switch 142 to receive the output of the comparator 134; that of the switch 143 to receive the output of the comparator 135; that of the switch 144 to receive the output of the comparator 136; that of the switch 145 to receive the output of the comparator 137; that of the switch 146 to receive the output of the comparator 138; and that of the switch 147 to receive the output of the comparator 139 respectively. Therefore, in case that the voltage VC1 which is the luminance signal for the area 6C1 and the reference voltage Vr7 are in a relation of $VC1 \geq Vr7$ the analog switch 140 is in an open state and the analog switch 144 is conductive. In the case of $VC1 < Vr7$, the analog switch 140 is conductive and the analog switch 144 is open. Other analog switches are likewise arranged, that is: In the case of $VC2 \geq Vr7$, the switch 141 is open and switch 145 is conductive. In the case of $VC2 < Vr7$, the switch 141 is conductive and the switch 145 is open. In the case of $VC3 \geq Vr7$, the switch 142 is open and the switch 146 conductive. If $VC3 < Vr7$, the switch 142 is conductive and the switch 146 open. In the case of $VC4 \geq Vr7$, the switch 143 is open and the switch 147 conductive. If $VC4 < Vr7$, the switch 143 is conductive and the switch 147 open.

Resistors 148, 149, 150 and 151 are of equal resistance values and are arranged to form a mean value circuit. An operational amplifier 152 has its output terminal connected to its negative input terminal and is thus arranged to serve as a voltage follower. Irrespectively of the conditions of the ensuing circuit elements, the operational amplifier 152 always produces from its output terminal the same voltage as the voltage received at its positive input terminal. The operational amplifier thus produces an output voltage VCx. The output voltage VCx is the average of four values including the smaller of the voltages VC1 and Vr7; the smaller of the voltages VC2 and Vr7; the smaller of the voltages VC3 and Vr7; and the smaller of the VC4 and Vr7. The mean voltage value VCx can be expressed as follows:

$$VCx=\{\min(VC1, Vr7)+\min(VC2, Vr7)+\min(VC3, Vr7)+\min(VC4, Vr7)\}/4$$

This voltage VCx is produced from an output terminal O1. In other words, the luminance signals VC1 to VC4 which are produced from the logarithmic compression circuits 16 to 19 are compared with the reference voltage Vr7 which is produced from the reference voltage generating circuit 131. Then, among the luminance signals VC1 to VC4, only the signals that are larger than the reference voltage Vr7 are replaced with the voltage Vr7 through the comparators 132 to 135, the inverters 136 to 139 and the analog switches 140 to 147 while the luminance signals that are smaller than the voltage Vr7 are supplied as they are to the mean value circuit which is composed of the resistors 148 to 151. A mean value thus obtained is then produced as the voltage VCx from the output terminal O1 via the operational amplifier 152.

Resistors 153, 154, 155 and 156 are of equal resistance values and jointly form another mean value circuit which is arranged to obtain a mean value of the luminance signals VC1 to VC4. Another operational amplifier 157 has its output terminal connected to its negative input terminal and is thus arranged to serve as a voltage follower. The operational amplifier 157 produces a voltage VCy from its output terminal at a value equal to a voltage received at its positive input terminal irrespectively of the conditions of the ensuing circuit elements. The output voltage VCy of the operational amplifier 157 which can be expressed as VCy=(VC1+VC2+VC3+VC4)/4 is produced from another output terminal O2. In other words, the luminance signal VC1 to VC4 which are produced from the logarithmic compression circuits 16 to 19 are supplied as they are to the mean value circuit formed by the resistors 153 to 156 and a mean value of them thus obtained is produced from the output terminal O2 via the operational amplifier 157.

In the case of the peripheral luminance computing circuit 20 of this embodiment, any of the peripheral luminance values that is larger than the reference voltage value Vr7 is replaced with the value Vr7 before obtaining the mean value VCx. The mean value VCx thus obtained is produced from the output terminal O1. Meanwhile, another mean value VCy which is obtained directly from these peripheral luminance values is produced from another output terminal O2.

With the peripheral luminance computing circuit 20 of FIG. 3 arranged in the manner as described above, an exposure can be accurately determined in cases where there is a difference in luminance among objects located in the peripheral areas of the photographing field.

It is a feature of each of the embodiments described that the exposure can be suitably adjusted according to the size of the main photographing object on the assumption that the main object is located in the middle part of the photographing field.

In FIGS. 7(a) to 7(i) and 9(a) to 9(i) referred to in the foregoing description of embodiments, the luminance signal level values are shown in such a manner that levels of adjoining areas are indicated as if they are equal to each other in the event of any small difference in luminance. However, these levelled illustrations of course do not exactly represent the actual level relation or a luminance difference smaller than a given value, such as Vp1. It should be understood that these illustrations are provided for an easy understanding of the invention.

In accordance with the arrangement of the embodiments shown in FIGS. 1 to 10, in cases where an object of a high degree of luminance like a cloudless sky is located in the peripheral area (including the areas 6C1 to 6C4) of the image plane, any luminance information on the peripheral part of the image plane that would mislead exposure determination (such as the value VC0 obtained by the peripheral luminance computing circuit 20 under such a condition as VC0>Vr0 or VC0>Vr7) is not used but is replaced with the reference voltage Vr0 or Vr7. The invention thus gives an adequate photometric value on the assumption that a main object is always in the middle part of the photographing field. Another advantage of the invention resides in that: In case that a whitish object is located in the middle part of the image plane under the above stated condition, the photometric value computation can be accomplished in such a way as to adequately highlight the main object. More specifically, the fixed reference voltage Vr0 or Vr7 which is not detrimental to adequate exposure determination is used as the luminance information on the peripheral part of the image plane. This enables the camera to depict the whitish object in its whitish state according to its luminance level.

In the embodiments as illustrated by FIGS. 1 to 10, the light receiving element 6 represents light receiving means. In FIG. 3, the circuit elements from the selection circuit 21 to the operational amplifier 30 represent computing means. In FIGS. 4 and 10, the peripheral luminance computing circuit 20 represents peripheral luminance correcting means. The areas 6A and 6B represent a middle area. The areas 6C1 to 6C4 represent a peripheral area.

While the outermost or peripheral area 6C is divided into four areas in the case of the embodiments described, this arrangement may be changed either to divide the area into smaller parts or without dividing it at all in obtaining a photometric value. Further, in the embodiments described, the middle part of the photographing field is divided into two annular areas; and the computing formulas ar determined by detecting luminance difference between the adjacent areas on the basis of luminance information on the peripheral area 6C. However, this arrangement may be changed to determine the computing formulas by utilizing the maximum and minimum values of the luminance formation on the smaller areas 6C1 to 6C4. Further, while this invention is applied to a single-lens reflex camera in the case of the embodiments described, the applicability of the invention is not limited to the camera of that type but also includes a camera of the lens shutter type. Further, while the selection circuit 21 is composed of logic circuits, it can be easily replaced with a micro-computer for performing the same function.

As described in the foregoing, in accordance with this invention, the device detects whether or not the luminance information on the luminance of the peripheral area exceeds a given upper limit value of luminance. If so, the peripheral luminance correcting means supplies the given upper limit luminance value to the computing means in place of the information on the luminance of the peripheral part. When the luminance of the peripheral area is so high as to affect the luminance value of the middle area, therefore, the upper limit luminance value is used for the photometric value computing operation in place of the information on the luminance of the peripheral area. In accordance with this invention, therefore, a photometric value apposite to a main object can be obtained even in the event of a luminance distribution having a high degree of luminance in the peripheral part of the photographing field.

What is claimed is:

1. A photometric device having light receiving means which is arranged to divide a photographing field at least into a mile area locate in its mile part and a peripheral area located on the outer side of the middle area and computing means which is arranged to compute a photometric value on the basis of luminance information obtained from the middle and peripheral areas wherein the peripheral area of the light receiving means is further divided into a plurality of smaller areas; smaller area luminance information is obtained for each of the smaller areas; and the luminance information from the peripheral area is a mean value obtained by averaging the luminance information values of the plurality of smaller areas, comprising:

(a) detecting means for detecting whether or not the luminance information obtained from the peripheral area only exceeds a given upper limit luminance level; and (b) correcting means arranged to supply specific luminance information in place of luminance information obtained from the peripheral area when said detecting means detects that the luminance information from the peripheral area is higher than the upper limit luminance level set for the peripheral area only.

2. A photometric device arranged to obtain luminance information on the luminance of each of photometric areas defined by dividing a photographing field at least into a middle area and a peripheral area located on the outer side of the middle area and to compute a photometric value on the basis of luminance information obtained from the middle and peripheral areas, wherein the peripheral area is further divided into smaller peripheral areas; smaller area luminance information is obtained form each of the smaller peripheral areas; and the luminance information form the peripheral area is a mean value obtained by averaging a plurality of smaller peripheral area luminance information values thus obtained, comprising:

(a) detecting means for detecting whether or not the luminance information obtained from the peripheral area only exceeds a given upper limit luminance level; and (b) correcting means arranged to use specific luminance information in place of the luminance information obtained from the peripheral area when said detecting means detects that the luminance information from the peripheral area exceeds the upper limit luminance level set for the peripheral area only.

* * * * *

UNITED STATES PATENT AND TRADEMARK OFFICE
CERTIFICATE OF CORRECTION

PATENT NO. : 4,870,443

DATED : September 26, 1989

INVENTOR(S) : Shingo Hayakawa, et al.

It is certified that error appears in the above-identified patent and that said Letters Patent is hereby corrected as shown below:

COLUMN 7:

Line 18, "a" should read --as--.

Line 51, "instance." should read --instance,--.

COLUMN 8:

Line 3, "cose" should read --case--.

COLUMN 11:

Line 53, "In the case of $\begin{bmatrix} \Delta BA < Vp2 \\ Vq1 < \Delta CyB \end{bmatrix}$"

should read

--In the case of $\begin{bmatrix} \Delta BA < VP2 \\ Vq1 < \Delta CyB \end{bmatrix}$ (1-8)--

UNITED STATES PATENT AND TRADEMARK OFFICE
CERTIFICATE OF CORRECTION

PATENT NO. : 4,870,443

DATED : September 26, 1989

INVENTOR(S) : Shingo Hayakawa, et al.

It is certified that error appears in the above-identified patent and that said Letters Patent is hereby corrected as shown below:

COLUMN 20:

Line 53, "mile area locate" should read --middle area located--, and "mile part" should read --middle part--.

COLUMN 21:

Line 17, "form" should read --from--.

COLUMN 22:

Line 1, "form" should read --from--.

Signed and Sealed this

Twenty-sixth Day of March, 199

Attest:

HARRY F. MANBECK, JR.

*Attesting Officer*     *Commissioner of Patents and Trademarks*